(12) United States Patent
Harutyunyan et al.

(10) Patent No.: US 9,876,813 B2
(45) Date of Patent: Jan. 23, 2018

(54) SYSTEM AND METHOD FOR WEB-BASED LOG ANALYSIS

(71) Applicant: Qualys, Inc., Redwood Shores, CA (US)

(72) Inventors: Artem Harutyunyan, Redwood City, CA (US); Amol R. Sarwate, San Jose, CA (US); Sumedh Thakar, San Jose, CA (US); Michael P. Shema, San Francisco, CA (US)

(73) Assignee: Qualys, Inc., Redwood Shores, CA (US)

( * ) Notice: Subject to any disclaimer, the term of this patent is extended or adjusted under 35 U.S.C. 154(b) by 0 days.

(21) Appl. No.: 14/619,423

(22) Filed: Feb. 11, 2015

(65) Prior Publication Data

US 2016/0234238 A1 Aug. 11, 2016

(51) Int. Cl.
*H04L 29/06* (2006.01)
*H04L 29/00* (2006.01)
*G06F 21/57* (2013.01)
*H04L 29/08* (2006.01)

(52) U.S. Cl.
CPC ...... *H04L 63/1433* (2013.01); *H04L 63/1425* (2013.01); *H04L 67/02* (2013.01)

(58) Field of Classification Search
CPC .................. G06F 21/577; H04L 63/1433
USPC .......................................................... 726/25
See application file for complete search history.

(56) References Cited

U.S. PATENT DOCUMENTS

| | | | |
|---|---|---|---|
| 7,962,961 B1* | 6/2011 | Griffin | G06F 21/566 709/224 |
| 2003/0159063 A1* | 8/2003 | Apfelbaum | G06F 21/577 726/25 |
| 2007/0208822 A1* | 9/2007 | Wang | H04L 63/1416 709/217 |
| 2011/0191854 A1* | 8/2011 | Giakouminakis | G06F 21/00 726/25 |
| 2011/0231935 A1* | 9/2011 | Gula | H04L 43/028 726/25 |
| 2014/0123285 A1* | 5/2014 | Ludwig | G06F 21/55 726/23 |
| 2015/0163199 A1* | 6/2015 | Kailash | H04L 63/0209 726/11 |
| 2016/0314302 A1* | 10/2016 | Sabetta | G06F 21/577 |

* cited by examiner

*Primary Examiner* — Alexander Lagor
(74) *Attorney, Agent, or Firm* — Baker & McKenzie LLP

(57) ABSTRACT

The technology described herein provides a novel system and method for web-based log analysis. The analysis combines the benefits of typical log monitoring systems with those of typical vulnerability managements systems. The synergy of the combined log monitoring and vulnerability management results in a single provider detecting vulnerability and subsequently accessing archived log data to detect if the vulnerability has been exploited in the past, identifying compromised machines for customers.

17 Claims, 2 Drawing Sheets

SYSTEM AND METHOD FOR WEB-BASED LOG ANALYSIS

FIELD OF THE DISCLOSURE

The presently described embodiments relate to a system for collecting and aggregating log files and a method for analyzing the logs in response to vulnerability detection. The presently described embodiments disclose a log monitoring system and method that provides advantages over previously known solutions.

BACKGROUND

Computing devices may write records of their activities to a log file. Log files may include records of events that happen within an operating system or other software running on a computing device. In some cases the operating system or software is responsible for writing to a log file, while in other cases a logging system may be used to capture and record log messages. Presently, log files may be used to debug software, troubleshoot system problems, or as part of a response to a security incident. Current log management systems typically perform log analysis for security reasons only after an intrusion is detected by some other appliance or separate system. Further, many log management systems index log data and then discard the original log data after the index has been created. The index itself often ends up being larger than the log data. These log management systems are typically installed at a customer's premises and take up large amounts of data storage space because of the large index files associated with them.

SUMMARY

The technology described herein provides a novel system and method for web-based log analysis. The analysis combines the benefits of typical log monitoring systems with those of typical vulnerability managements systems. The synergy of the combined log monitoring and vulnerability management results in a single provider detecting vulnerability and subsequently accessing archived log data to detect if the vulnerability has been exploited in the past, identifying compromised machines for customers. The combined use of the systems also allows for a single vulnerability database with vulnerability signatures and vulnerability traces.

In the disclosed system, a log management appliance resides within a customer network. The log management device receives log data and processes it for transmission to cloud based storage. Once received at the cloud based storage, the log data may be further refined and metadata may be gathered regarding the log data and machines related to the log data for display at a customer interface dashboard. A vulnerability database may be maintained that contains vulnerability entries. Each entry may contain an identifier for the vulnerability, a vulnerability signature, and a vulnerability trace. The vulnerability signature may be used to identify the existence of the vulnerability on a machine. The vulnerability trace may be used when a vulnerability is detected to scan the archived log data to determine if an exploit has occurred in the past. The vulnerability trace may be generated by executing the exploit and monitoring log data to determine what is written into the log data when the exploit occurs.

BRIEF DESCRIPTION OF THE DRAWINGS

Reference is now made to the following detailed description of the preferred embodiments, taken in conjunction with the accompanying drawings. Various features may not be drawn to scale. In fact, the dimensions of various features may be arbitrarily increased or reduced for clarity of discussion. In addition, some components may be omitted in certain figures for clarity of discussion. Reference is now made to the following descriptions taken in conjunction with the accompanying drawings, in which.

Figure 1:
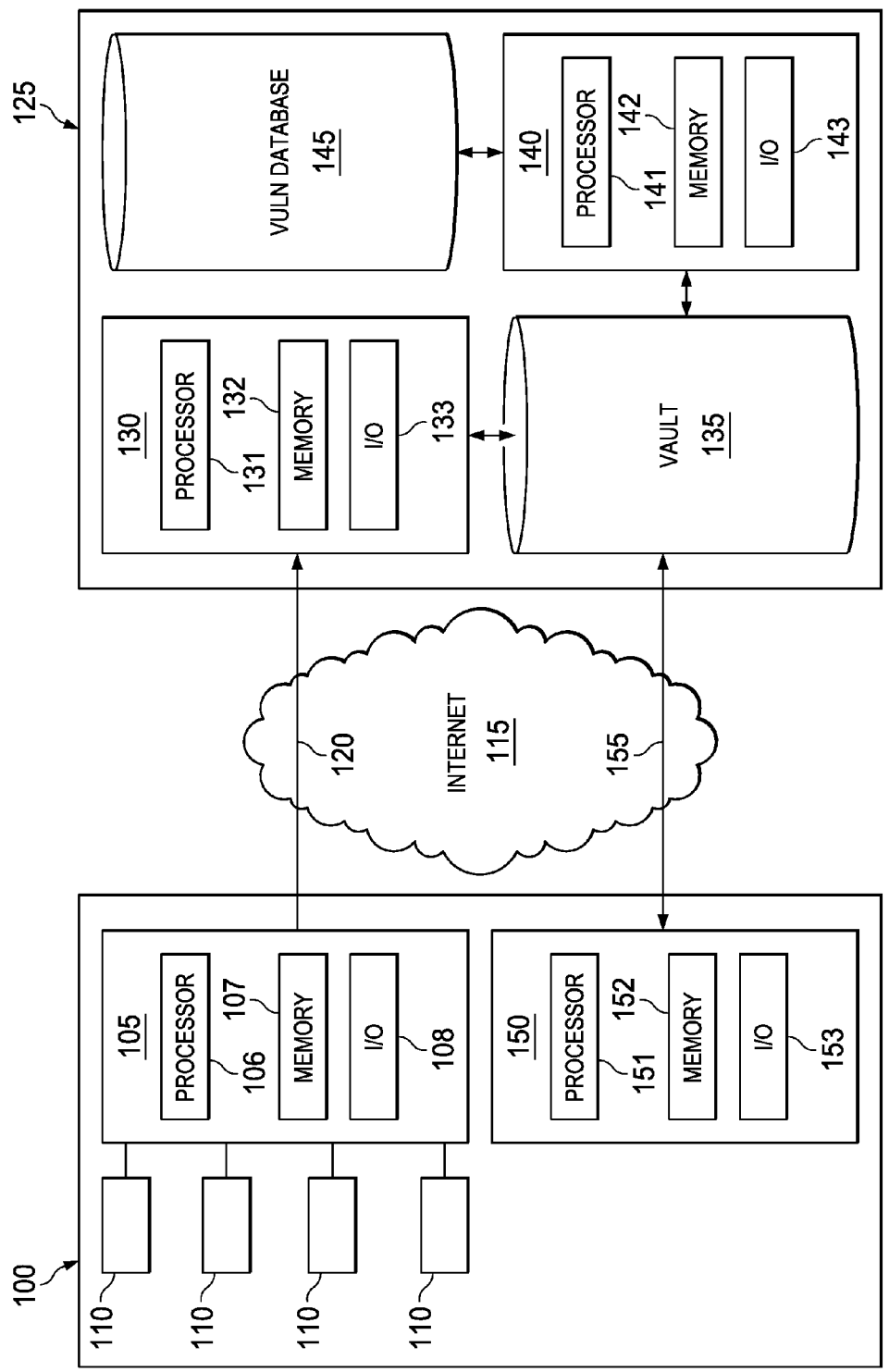
FIG. 1 is a block diagram of an embodiment of a system for web-based log analysis in accordance with the disclosed principles.

These exemplary figures and embodiments are to provide a written, detailed description of the embodiments set forth by any claims that issue from the present application. These exemplary figures and embodiments should not be used to limit the any claims that ultimately issue in a patent from the present application.

DETAILED DESCRIPTION

In an embodiment, the web-based log analysis system may comprise a log management (LM) appliance installed in a customer's network. As used herein, networks may represent any form of communication network between connected machines and any other network elements, and may also represent a collection of machines or virtual machines operable to provide cloud computing services to users. Networks may include a public cloud or a private cloud. Networks may include routers, hubs, switches, firewalls, content switches, gateways, call controllers, and/or any other suitable components in any suitable form or arrangement. Networks may include, in whole or in part, one or more secured and/or encrypted Virtual Private Networks (VPNs) operable to couple one or more network elements together by operating or communicating over elements of a public or external communication network.

The log management appliance may be configured to either receive log data and/or proactively collect log data from a customer's computing devices. Computing devices, or devices, may include any device with a network interface, which includes, but is not limited to, network components, desktop computers, laptops, or mobile devices. The log management appliance may receive log data from the customer's computing devices in several ways. In some cases, a client may be installed on the customer's computing devices that gathers log data and sends it to the log management appliance at pre-determined times or intervals. For example, the log data may be sent hourly, daily, or only at times when network usage is light, reducing network load when users are most likely to utilize the customer's computing devices. In some other cases, the customer's computing devices may be configured to send log data without the need to install a client, this may free up resources on the client's computing devices. The log management appliance may also be configured to listen for and collect log data sent from the customer's computing device without a client on the customer's computing devices. To collect the log data, the log management appliance may access the customer's computing devices and retrieve the log data or simply listen for log data to be transmitted.

The log management appliance may package and/or archive the log data after it has been received. Log data may be packaged based on the type of computing device it came from, the network it was retrieved from, or other factors impacting the form of package used. Archiving of the log data may prepare it for long term storage. In some cases, the archival process may compress the data for storage efficiency. Compression may also aid in reducing the bandwidth required for transmission of the log data.

Once the log data has been processed by the log management appliance, the log management appliance may transmit the log data to an offsite storage, for example a cloud based storage. The log data may be transmitted via a secure channel to the offsite storage to ensure the processed log data remains confidential. The secure channel may be a one-way transmission medium. A one-way transmission medium may prevent intrusion on the log management appliance, because the log management appliance may be configured to only transmit and not receive via the secure channel.

At the off site storage additional processing may be performed on the log data. For example, metadata or other information may be collected, processed, and displayed to a user at a user-interface (UI) dashboard. The dashboard may give a summary of the log data available or the overall status of the customer's computing devices. The dashboard may be accessed locally at the off site storage facility, or remotely form another location. The log data may remain available at the offsite storage for future analysis by the customer.

The log data may also be used by network security specialists. A network vulnerability may be discovered by the network security community. When a network vulnerability is detected, a network security specialist may review the vulnerability and create a signature for the vulnerability. The signature may include data about the vulnerability, for example how the vulnerability is exploited and how the vulnerability may be detected. The network security specialist may also determine a trace that may be left in a log file when the vulnerability is exploited. For example, a specific command may be executed by a hacker to exploit the vulnerability. When the specific command is executed, the computer system may write an entry to a log file tracking execution of the command. The entry in the log file would be considered a trace that the vulnerability had been executed on that system.

When a new vulnerability is discovered, a user may retrieve the log data from the offsite storage and scan the log data for a trace of the particular vulnerability. If the trace is found, the user may alert the customer that a particular computing device has been exploited, allowing the customer to take appropriate remedial action. For example, patching the computer system to protect against future exploits, removing the computer system from the network, and/or performing additional forensic analysis of log files to determine the extent of the exploit.

Scanning log data may be useful when a network security appliance determines that a computer system is vulnerable to an existing exploit. For example, a web application scanner may determine that a particular web application is vulnerable. Once that determination is made, the customer may take remedial action. Depending on how long the web application has been vulnerable, the customer may wish to analyze the log data to determine if the web application has been exploited in the past. In order to accomplish this, the vulnerability signature related to the exploit may need to contain the trace of the exploit that may be found in the log data. Information about the trace for the vulnerability may be retrieved and then the offsite log data may be analyzed to determine if the computing device has been exploited.

Vulnerability signatures may be collected and stored in a vulnerability database. The vulnerability database may be accessed any time a vulnerability is detected on a computer system. Each time a new exploit is detected, the exploit may be analyzed for characteristics to define a vulnerability. The characteristics may include particular commands that are used to exploit the vulnerability or other identifying information. The characteristics may be used to create a vulnerability signature. The exploit may also leave traces in log files when the exploit is executed or when an attempt to exploit the vulnerability is executed. The traces may also be stored in the vulnerability database. The vulnerability database may be used by a web application scanner, or some other scanner, e.g., a vulnerability management scanner, to detect a vulnerability, then by a web application firewall to create a rule to protect against the vulnerability, and finally by a log scanner to scan the log data to determine if the vulnerability has in fact been exploited in the past.

The following is an example scenario of how the log management system may be used. Hackers often attack webservers. These attacks may involve a hacker issuing a request or command that exploits a vulnerability. The webserver may be configured to log requests and commands that it receives. In this case, the webserver may log the request sent by the hacker and parameters submitted with the request. An engineer may have previously encountered this vulnerability and created an entry in the vulnerability database for the vulnerability. The vulnerability entry may include a signature used for detecting the presence of the vulnerability and/or detecting attempts to exploit the vulnerability. For example, the signature may include data that all servers running a certain version of an operating system are vulnerable to the exploit associated with the signature. The vulnerability entry may further include the trace for scanning log data to determine if the vulnerability has been exploited. For example, an exploit may leave a certain string in a log file. The string may be indicative that the vulnerability was exploited on the particular system that the log data was retrieved from. At some point, it may be determined that a webserver is vulnerable to an exploit. This determination may be made by a device operating inside of the customer's network, or by a device outside the customer's network that interacts with the customer's internet connected computing devices. Once the vulnerability is detected, the customer may use the vulnerability database to determine how to protect against the vulnerability. Further, the customer may wish to scan log data to determine if the vulnerable webserver has been exploited. This may be done by determining a trace associated with the vulnerability and then scanning the log data for the trace. The customer may access the log data via a dashboard application. The dashboard application may be used to perform the scans as well as retrieve status reports of the log data and the system status in general.

The web-based log analysis system may also be used to assist web application scanning devices. For example, the log management appliance may receive log data from a customer's webservers. The log data may be archived and transmitted to cloud based storage. Typically, a web application scanning device may receive a single web address to scan, however, many other web addresses may be linked to from that single web address, each needing to be scanned. The web application scanning device may then try to connect to each of the additional web addresses determined from the provided web address. In some cases, the web application scanning device may not detect every possible link from a particular page. However, the archived logs may be analyzed to determine which web addresses are most popular on the customers webserver. Based on this information, the web application scanner may determine the amount of traffic that visits the website and what percentage of the pages visited by the website's traffic have been scanned by the web application scanner. The log data may also be used to detect web pages that may not have been detected using traditional web application scanning and provide those addresses to the web application scanning appliance.

As used herein, processors may control actions of a device or machine. Any actions described as being taken by a processor might be taken by the processor alone or by the processor in conjunction with one or more additional components. Additionally, while only one processor may be shown in certain devices, multiple processors may be present. Thus, while instructions may be discussed as being executed by a processor, the instructions may be executed simultaneously, serially, or otherwise by one or multiple processors. A processor may be implemented as one or more CPU chips and may be a hardware device capable of executing computer instructions. The processor may execute instructions, codes, computer programs, or scripts. The instructions, codes, computer programs, or scripts may be received from an I/O module or from memory.

As used herein, an I/O module may include modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. I/O modules may also include liquid crystal displays (LCDs), touch screen displays, keyboards, keypads, switches, dials, mice, track balls, voice recognizers, card readers, paper tape readers, printers, video monitors, or other well-known input/output devices.

As used herein, memory may include random access memory (RAM), read only memory (ROM), or various forms of secondary storage. RAM may be used to store volatile data and/or to store instructions that may be executed by a processor. ROM may be a non-volatile memory device that may have a smaller memory capacity than the memory capacity of a secondary storage. ROM may be used to store instructions and/or data that may be read during execution of computer instructions. Access to both RAM and ROM may be faster than access to secondary storage. Secondary storage may be comprised of one or more disk drives or tape drives and may be used for non-volatile storage of data or as an over-flow data storage device if RAM is not large enough to hold all working data. Secondary storage may be used to store programs that may be loaded into RAM when such programs are selected for execution.

FIG. 1 is a block diagram of an embodiment of a web-based log analysis system. Customer network 100 may be made up of several computing devices 110. The computing devices 110 may be webservers, PCs, routers, or any other computing device used in a network. Each computing device 110 may create log data based on various actions taken by the computing device 110. Customer network 100 may also contain a log management appliance 105. Log management appliance 105 may comprise a processor 106, memory 107, and an I/O module 108. Log management appliance 105 may actively retrieve log data from computing devices 110 and/or may passively receive log data from computing devices 110. Log management appliance 105 may create an archive of the log data and transmit the archive to log processing device 130 via secure channel 120. Secure channel 120 may be a uni-directional channel, preventing incoming traffic from the internet accessing the log management appliance 105. Log processing device 130 may reside in an off-site network 125. Log processing device 130 may comprise a processor 131, a memory 132, and an I/O module 133. Log processing device 130 may perform additional processing of the log data before writing the log data to storage vault 135. Storage vault 135 may be referred to as off-site storage or cloud based storage. Occasionally network security engineers may detect a vulnerability that exists in a computing device 110. The vulnerability may be connected to an exploit that may be used against computing devices 110. The network security engineers may create an entry in vulnerability database 145 for the discovered vulnerability. The vulnerability database entry may also contain one or more traces for each vulnerability. The traces may be indicators found in the log data that indicate an exploit has been attempted or successfully performed against the computing device 110 that the log data is associated with. In cases where a computing device 110 is determined to have a vulnerability, log analysis device 140 may retrieve the traces associated with the vulnerability from vulnerability database 145. Log analysis device 140 may comprise a processor 141, memory 142, and I/O module 143. Log analysis device 140 may also retrieve log data of the vulnerable computing device 110 from the vault 135. Log analysis device 140 may then search the retrieved log data for the traces. If a trace is found, then the customer may be notified that the computing device 110 has been exploited. In some cases, the customer may want to review archived data. In these cases, a customer based analysis device 150 may be used to access vault 135 via a second bi-directional secure channel 155. Customer based analysis device 150 may comprise a processor 151, a memory 152, and an I/O module 153. Customer based analysis device 150 may comprise modules for customers to access and analyze logs from the vault 135, for example a dashboard or other interface for accessing and analyzing log data.

Figure 2:
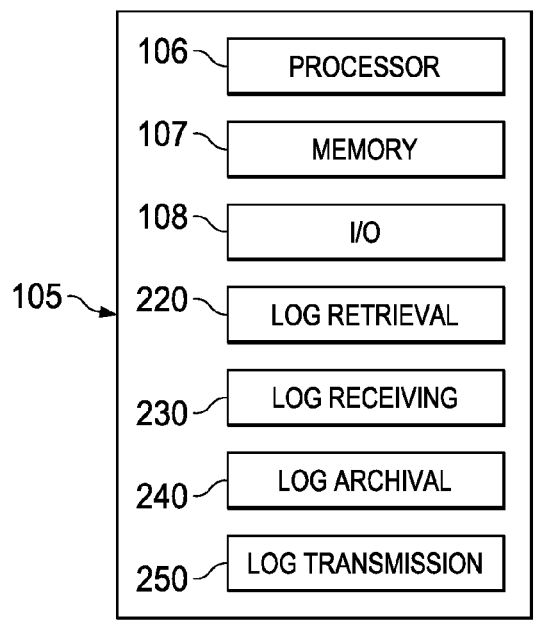
FIG. 2 is a block diagram of an embodiment of a log management appliance.

FIG. 2 is a block diagram of an embodiment of a log management appliance 105. Log management appliance 210 may comprise a log retrieval module 220, a log receiving module 230, a log archival module 240, a log transmission module 250, processor 106, memory 107, and I/O module 108. Log retrieval module 220 may be configured to contact computing devices in a network and request log data. Log retrieval module 220 may be configured to request the log data at regular intervals, or on demand as required by a user. Log receiving module 230 may be configured to receive log data from computing devices in the network. The log data may be received based upon requests from the log retrieval module 220. The log data may also be received unsolicited from clients installed on computing devices, or other configurations of the computing devices causing log data to be transmitted form the computing device to log receiving module 230. Received log data may be processed by the log archival module 240. Processing may include packaging log data and/or archiving the log data. After processing, the log data may be transmitted by the log transmission module 250. Log transmission module 250 may be connected to an offsite cloud based storage solution via a secured channel.

Figure 3:
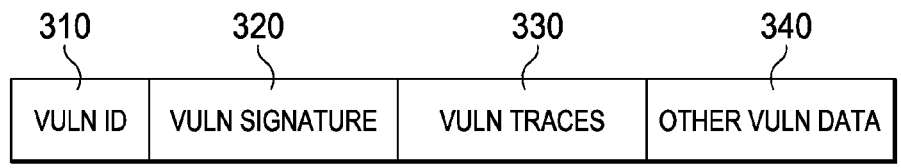
FIG. 3 is a diagram of an embodiment of a vulnerability database entry.

FIG. 3 is a diagram of an embodiment of an entry in a vulnerability database. The entry may comprise a vulnerability identifier 310. The vulnerability identifier 310 may be the name of the vulnerability, a one up numbering scheme, or any other form of identification desired by the database owner and/or manager. The entry may further comprise a vulnerability signature 320. The vulnerability signature 320 may be some way of identifying that the vulnerability exists on a computing device. For example, the vulnerability signature 320 may indicate that revision 16 of a software application is vulnerable to an exploit. The entry may also comprise a vulnerability trace 330. The vulnerability trace 330 may be a character string or other identifier that is found in log data when the vulnerability has been exploited. The vulnerability trace 330 may enable users to review log data after a vulnerability has been detected to determine if a computing device has been exploited. The vulnerability database entry may also comprise additional data fields 340. The additional data fields 340 may contain any additional data relevant to the vulnerability.

Figure 4:
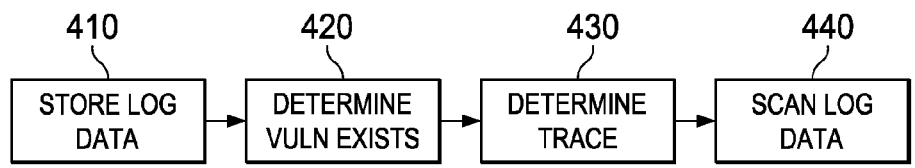
FIG. 4 is a flow diagram of an embodiment of a method for web-based log analysis.

FIG. 4 is a flow diagram of an embodiment of a method for web-based log analysis. The flow begins at step 410 when log data is stored at an offsite storage location, for example cloud based data storage. The log data may be gathered from within a user's network by a log management appliance and then transferred to the offsite storage location for storage. At step 420, the existence of a vulnerability is determined. The determination may be made by devices scanning the user's network or by other means of detecting vulnerabilities. Once the vulnerability has been detected, a trace for the vulnerability 430 must be determined. The trace may be retrieved from a vulnerability database. In some cases, an analyst may have to determine a trace by executing the exploit in a test environment, and observing log data for entries made when the exploit is executed. Once the trace has been determined at step 430, the stored log data may be scanned at step 440. The stored log data is scanned for the trace. If the trace is found, then the device may be considered to have been compromised using the exploit associated with the vulnerability.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

While various embodiments in accordance with the disclosed principles have been described above, it should be understood that they have been presented by way of example only, and are not limiting. Thus, the breadth and scope of the embodiments should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the embodiments set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any embodiments in this disclosure. Neither is the "Summary" to be considered as a characterization of the embodiments set forth in issued claims. Furthermore, any reference in this disclosure to embodiment in the singular should not be used to argue that there is only a single point of novelty in this disclosure. Multiple embodiments may be set forth according to the limitations of the multiple claims issuing from this disclosure, and such claims accordingly define the embodiments, and their equivalents, that are protected thereby. In all instances, the scope of such claims shall be considered on their own merits in light of this disclosure, but should not be constrained by the headings herein.

What is claimed is:

1. A method for web-based log analysis comprising the steps of:

receiving log data from one or more devices, wherein the log data is received from the one or more devices by a log management appliance;

determining a vulnerability actually exists at a device, the device being one of the one or more devices;

after determining the vulnerability actually exists at the device, determining a trace related to the vulnerability actually existing at the device, wherein determining the trace comprises:

executing an exploit related to the vulnerability actually existing at the device;

monitoring the log data created responsive to executing the exploit;

generating the trace based upon the log data;

scanning the log data for the trace;

in response to finding the trace in the log data, determining the device is vulnerable to or has been compromised by the exploit related to the vulnerability actually existing at the device; and transmitting the log data to a storage, wherein the log data is transmitted from the log management appliance to the storage via a uni-directional channel between the log management appliance and the storage, wherein the uni-directional channel prevents access to the log data in the storage, and wherein the log data is stored in the storage.

2. The method of claim 1, wherein the storage comprises cloud based storage.

3. The method of claim 1, wherein determining the vulnerability actually exists comprises scanning the one or more devices for vulnerabilities using data from a vulnerability database.

4. The method of claim 3, wherein determining the trace related to the vulnerability comprises retrieving the trace from the vulnerability database.

5. The method of claim 1, further comprising in response to finding the trace in the log data, providing a notification to a user of the device.

6. The method of claim 3, further comprising writing the trace to an entry in the vulnerability database, the entry corresponding to the vulnerability.

7. The method of claim 3, wherein the vulnerability database comprises a plurality of entries, each entry corresponding to a vulnerability, each entry comprising an identifier, a signature, and a trace.

8. The method of claim 1, wherein the trace comprises an indicator that the device is vulnerable to the exploit related to the vulnerability.

9. The method of claim 1, further comprising in response to finding the trace in the log data, providing a notification to a user of the device, wherein the user of the device accesses, using an analysis device, and via a bi-directional channel between the analysis device and the storage, the log data in the storage.

10. The method of claim 1, wherein receiving the log data from the one or more devices comprises both actively soliciting the log data based on requests being transmitted to first devices of the one or more devices and passively receiving the log data without requests being transmitted to second devices of the one or more devices.

11. A system for web-based log analysis comprising:
one or more hardware processors configured to:
receive log data from one or more devices, wherein the log data is received from the one or more devices by a log management appliance;
determine a vulnerability actually exists at a device, the device being one of the one or more devices;
after determining the vulnerability actually exists at the device, determine a trace related to the vulnerability actually existing at the device, wherein determining the trace comprises:
executing an exploit related to the vulnerability actually existing at the device;
monitoring the log data created responsive to executing the exploit;
generating the trace based upon the log data;
scan the log data for the trace;
in response to finding the trace in the log data, determine the device has is vulnerable to or has been compromised by the exploit related to the vulnerability actually existing at the device; and
transmit the log data to a storage, wherein the log data is transmitted from the log management appliance to the storage via a uni-directional channel between the log management appliance and the storage, wherein the uni-directional channel prevents access to the log data in the storage, and
wherein the log data is stored in the storage.

12. The system of claim 11, wherein the storage comprises a cloud based storage.

13. The system of claim 11, wherein the one or more processors is further configured to scan the one or more devices for vulnerabilities using data from a vulnerability database.

14. The system of claim 13, wherein the one or more processors is further configured to retrieve the trace from the vulnerability database.

15. The system of claim 11, wherein the one or more processors is further configured to in response to finding the trace in the log data, provide a notification to a user of the device.

16. The system of claim 13, wherein the one or more processors is further configured to write the trace to an entry in the vulnerability database, the entry corresponding to the vulnerability.

17. The system of claim 13, wherein the vulnerability database comprises a plurality of entries, each entry corresponding to a vulnerability, each entry comprising an identifier, a signature, and a trace.

\* \* \* \* \*